United States Patent [19]

Bell et al.

[11] 4,293,140
[45] Oct. 6, 1981

[54] AUTOMOBILE SPLASH GUARD AND ATTACHMENT MEANS THEREFOR

[75] Inventors: Ted A. Bell, Coshocton; Daniel F. Lehner, Lafayette, both of Ohio

[73] Assignee: Pretty Products, Inc., Coshocton, Ohio

[21] Appl. No.: 966,505

[22] Filed: Dec. 4, 1978

[51] Int. Cl.³ ............................................. B62D 25/16
[52] U.S. Cl. ................. 280/154.5 R; 428/31
[58] Field of Search .................. 280/154.5 R, 154.5 A, 280/153 R, 153 A, 152 R, 152 A, 153.5, 154; 428/31, 52, 131–133, 213; 156/91, 92; 293/30, 112, 141; 24/73 FT, 73 MF, 73 PM, 81 BM, 81 FT; 151/41.75

[56] References Cited

U.S. PATENT DOCUMENTS

| | | | |
|---|---|---|---|
| 1,903,469 | 4/1933 | Meader | 24/73 FT |
| 1,934,135 | 11/1933 | McCollum | 280/154.5 R |
| 1,993,067 | 3/1935 | Littlefield | 280/154.5 R |
| 2,218,690 | 10/1940 | Strauch | 280/152 R |
| 2,278,691 | 4/1942 | Cotter | 24/73 MF |
| 2,335,058 | 11/1943 | Haltenberger | 280/153 R X |
| 2,559,755 | 7/1951 | Bratz | 280/152 R |
| 2,775,010 | 12/1956 | Bedford, Jr. | 24/73 FT |
| 2,888,971 | 6/1959 | Wootton | 151/41.75 |
| 2,974,383 | 3/1961 | Bright | 156/92 X |
| 3,279,818 | 10/1966 | Jones | 280/154.5 R |
| 4,011,636 | 3/1977 | Malacheski | 24/81 FT X |
| 4,089,537 | 5/1978 | Pralutsky | 280/154.5 R |

FOREIGN PATENT DOCUMENTS 2529718 1/1977 Fed. Rep. of Germany .
2410591 8/1979 France .
7707829 8/1978 Netherlands .

*Primary Examiner*—Joseph F. Peters, Jr.
*Assistant Examiner*—D. W. Underwood
*Attorney, Agent, or Firm*—Robert E. Stebens

[57] ABSTRACT

A splash guard structure for automotive vehicles is provided for use in conjunction with a supporting structure having a flanged lip including vertically extending portions. This splash guard structure includes a sheet preferably of heavy rubber formed with two sets of recessed sockets. These sets of sockets are located at respective upper corner and lower portions of an arcuate edge of the splash guard and arranged to accommodate various vehicle body configurations. A thin membrane of the rubber exists at the bottom of each of the sockets of the splash guard and only the membrane of two selected sockets are ruptured for each specific installation thereby maintaining the integrity of the guard to prevent passage of water and debris therethrough. Also included in the combination are two metal clips having a Z-shaped configuration and which are coated with a rust resistant finish and are formed with two legs cooperating with a center interconnecting bar to form clamping elements. The one leg is easily inserted through the membrane of the appropriate socket on the splash guard, while the other leg is conveniently and securely attached to the flanged lip of the supporting structure. The flanged lip, which exists as part of the body fender at the wheel well is engaged in mechanically coupled relationship by barbs formed on the one leg of the clip.

22 Claims, 15 Drawing Figures

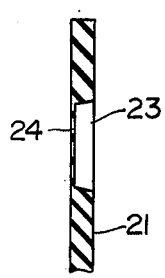
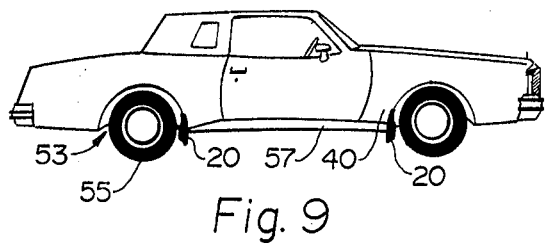
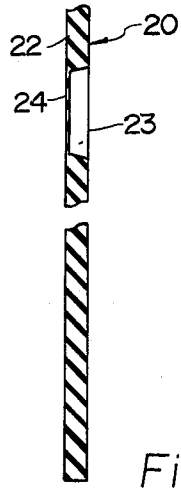
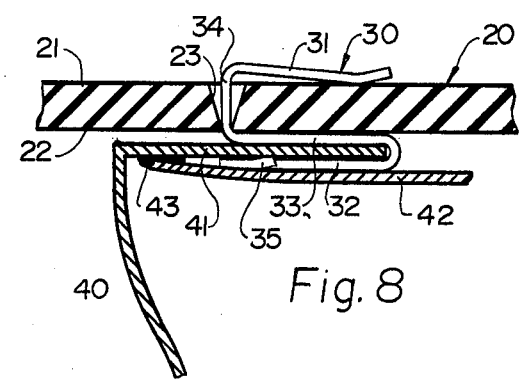
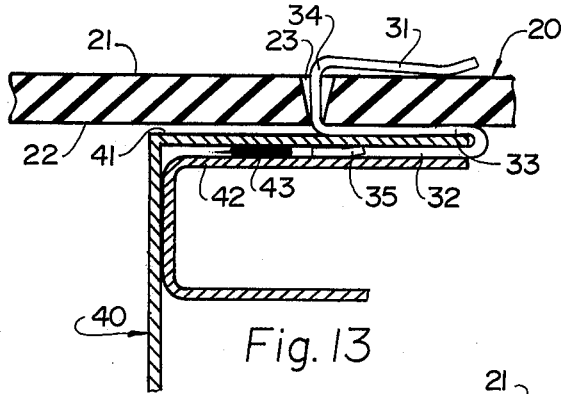
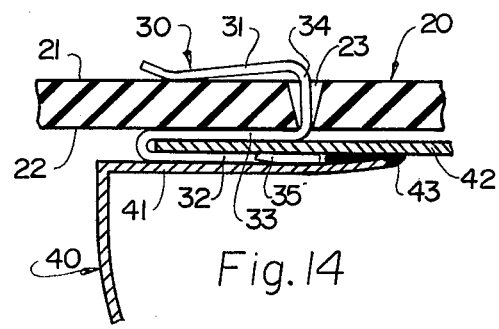

AUTOMOBILE SPLASH GUARD AND ATTACHMENT MEANS THEREFOR

BACKGROUND OF THE INVENTION

This invention is directed to the providing of a suitable splash guard structure which is designed to be utilized in combination with current automotive vehicles having contemporary body styling. It is of the type designed for attachment to a portion of the body fender or fender wall associated with a wheel well, and is designed to prevent the splashing of water and rocks against the automotive vehicle body surface.

Several other types of splash guards are known for use in conjunction with automotive vehicles, however, their configuration is not based upon contemporary automotive styling standards and the scope of their utilization is limited. Most of these similar known structures are of two types. One type of splash guard is secured to the metal automotive body by means of self-tapping screws. This procedure is less than satisfactory in that the drilling operations are cumbersome and generally require the removal of the wheel. Also, by drilling holes into the sheet metal of the vehicle body in an area exposed to water, road salt, and rocks, this procedure tends to promote possible rust and corrosion of the underbody.

The second type of splash guard is supported in vertically depending relationship to a fender having an enlarged bead or marginal edge and is adapted to be secured thereto by spring clips or clamps. Two examples of this latter type are disclosed in the U.S. patents issued to McCollum, U.S. Pat. No. 1,934,135 and Littlefield, U.S. Pat. No. 1,993,067. In both patents the splash guard hangs from the lower rear edge of the fender. McCollum utilizes a U-shaped clamp which embraces a bead at the lower end of the fender. The splash guard apron in McCollum is formed with two openings through which the clamp is inserted for attachment to the fender.

McCollum's guard is of a construction that requires that a bead exist at the edge of the fender. Furthermore, it is limited in attachment to only being secured along that bottom edge of the fender. Also, the position of the guard is not adjustable to most effectively fit and therefore protect the many styles of automotive vehicles, particularly those that are presently on the market. There are no alternative openings provided to obtain maximum protection for the vehicle body by allowing attachment to conform to the particular style of vehicle. Most current vehicle styles have a generally inturned configuration in the vicinity of the wheel well, such that a greater portion of the body surface adjacent to the wheel well is able to be damaged by the throwing of water and rocks by the wheels. Similarly, Littlefield's guard employs a two piece spring clamp which embraces a bead at the lower end of the fender. Littlefield provides for more than two attaching devices to allow some adjustability; but, still his device requires that a bead exist at the bottom edge of the fender, and it is limited to attachment only along that edge. While the guard is adjustable along the edge of the fender, it is not adjustable vertically to provide maximum protection.

SUMMARY OF THE INVENTION

In accordance with this invention, a splash guard for automotive vehicles and an attachment therefor is provided for advantageous use in conjunction with a wheel well and exterior vehicle body panel forming a supporting structure having a thin plate or flanged lip including vertically extending portions. The guard of this invention is formed from a relatively heavy rubber or vinyl material, and two Z-shaped metal clips for securing it to a supporting structure at an optimum selected position. A sheet of the material which serves as the splash guard is formed with a plurality of sockets which are selectived for engagement by the two clips to enable the guard to be mounted at the desired position on the vehicle body.

These sockets are arranged in sets at an upper corner and at a lower portion of the arcuately curved edge at positions to best coincide with the inturned curvature of the vehicle body at the wheel well opening. These molded sockets are of a width which is at least equal to or slightly greater than the width of the clip which is to be inserted. While the recessed sockets are all visible on a front surface of the sheet, the rear face of the sheet does not disclose their existence. Since the recessed socket does not extend completely through the splash guard, a thin membrane of rubber exists at the rear face. This membrane can be punctured easily and form an open slot for insertion of the clip. The membrane allows for easy insertion of the clip into the desired socket, while not permitting the passage of water, and dirt through the other sockets.

Also included in the combination are two metal clips which are of a configuration to advantageously function in securing the guard to the vehicle. Each clip is coated with a rust resistant finish to remain effective for a maximum period of time and have a pleasing appearance since a portion will be visible. The clips are of a Z-shaped configuration comprising two legs which, in cooperation with a center interconnecting bar, form respective oppositely directed clamping elements. One leg is designed to insert into the appropriate slot on the splash guard with the other leg designed to engage with the supporting structure in rigidly fixed engagement. In addition, the latter leg is preferably equipped with a pair of barbs which project inwardly thus providing for a more secure attachment.

A third element in the combination is the plate or flanged lip of the vehicle body and wheel well forming a support structure including vertically extending portions. In most present day automotive vehicles, a flanged lip frequently exists as part of the wall of the vehicle's body at the wheel well. This lip normally overlaps with the inner wheel well wall or projects a distance inwardly. The two pieces of sheet metal are held together by a weld and result in the formation of an overlapping marginal edge portion. The barbed leg of the clip is inserted into the small opening which exists between the wheel well wall and the inturned lip and frictionally engages the flanged lip in mechanically coupled relationship.

The primary objective of this invention is to provide an effective splash guard to prevent the splashing of rocks, water, and road salt against the surfaces of the automotive vehicle body in the vicinity of the wheel well.

Another objective of this invention is to provide a convenient means in technique for enabling a person to easily attach the splash guard to the vehicle body without having to resort to the drilling technique and utilization of self-tapping screws.

A still further objective of this invention is to enable one to utilize spring-clips that will frictionally interengage with the splash guard and also with the vehicle body at the rim of the wheel well.

A fourth objective of the invention is to provide a splash guard which is vertically positionable to allow for location at a particular position that provides the most effective protection for a specific vehicle's body configuration.

Still another objective of the invention is to provide an aesthetically pleasing splash guard to complement the appearance of the automotive vehicle to which it is attached.

These and other objectives and advantages of this invention will be readily apparent from the following detailed description of an illustrative embodiment thereof. Reference will be had to the accompanying drawings which illustrate the embodiment of the invention.

DESCRIPTION OF THE DRAWING FIGURES

FIG. 1 an elevational view of the splash guard embodying this invention as mounted on a vehicle.

FIG. 5 is a vertical sectional view taken along line 5—5 of FIG. 2.

FIG. 8 is a fragmentary sectional view on an enlarged scale taken on a horizontal plane of a splash guard and attachment clip assembled with a vehicle body along line 8—8 of FIG. 1.

FIG. 9 is a side elevational view of an automotive vehicle having splash guards of this invention mounted thereon.

FIG. 13 is a horizontal sectional view similar to FIG. 8 but showing a modified mounting.

FIG. 14 is a horizontal sectional view similar to FIG. 8 but showing a further modified mounting.

DESCRIPTION OF THE ILLUSTRATIVE EMBODIMENT

Figure 1:
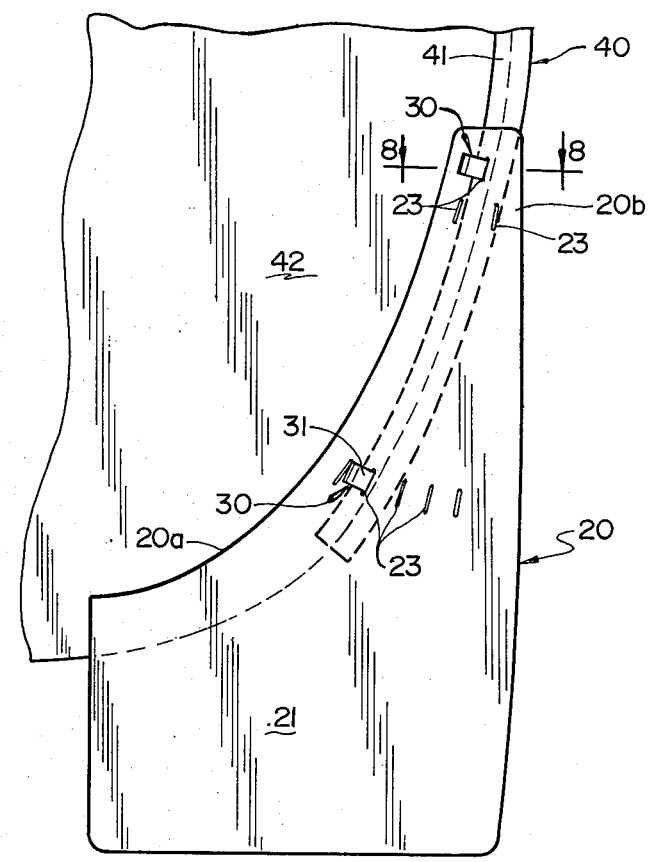

Having reference to the drawings, attention is directed first to FIG. 1 which illustrates a splash guard structure, designated generally by the numeral 20, embodying this invention and installed in operative relationship to an automotive vehicle body. This assembly comprises a splash guard 20, a pair of attachment clips 30, and a supporting structure of the vehicle's body comprising an outer body wall or fender 40 having an inturned lip 41, and an inner wheel well wall 42. One portion of each clip 30 projects through the splash guard 20 while the other end is attached to the inturned lip 41 of the outer fender 40.

Figure 2:
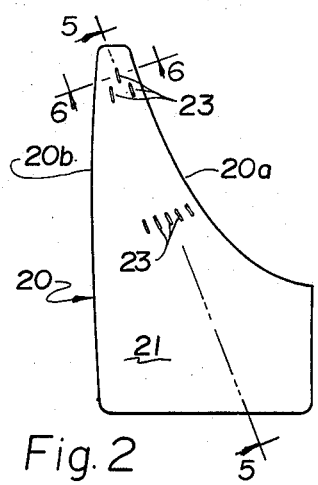
FIG. 2 is a plan view of one surface of the splash guard.
Figure 3:
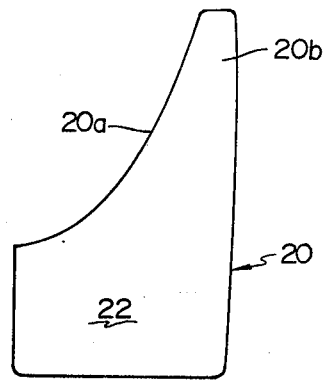
FIG. 3 is a plan view of the opposite surface of the splash guard.

The splash guard 20 is shown independently in FIGS. 2, 3 and 5. A suitable material for fabrication of the splash guard 20 preferably would be rubber, but appropriate plastic materials could also be selected. It would be heavy and thick enough to be durable and capable of resisting undue flexing as well as to last for a long time. It could be provided in colors coordinated to most cars. FIG. 2 discloses the frontal face 21 of the splash guard which is oriented to face forwardly with reference to the vehicle while the opposite surface 22 shown in FIG. 3 may be provided with various types of decoration. A particular guard configuration is illustrated but it will be understood that modification thereof is contemplated as may be dictated by changing vehicle body styles as well as to provide a specifically desired ornamental appearance. The guard in the illustrated embodiment has an arcuately formed edge 20a which is designed to best accommodate the generally curved body style of most current vehicles and is seen to terminate in a relatively narrow upper end portion 20b.

Figure 6:
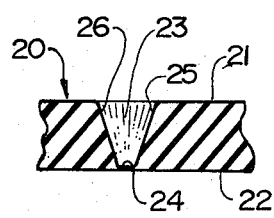
FIG. 6 is a fragmentary vertical sectional view on an enlarged scale taken along line 6—6 of FIG. 2.
Figure 7:
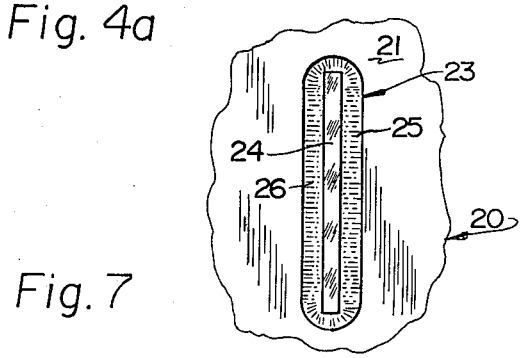
FIG. 7 is a fragmentary plan view of the splash guard showing a clip receiving socket on an enlarged scale.

Located in the upper end portion 20b and in the midsection of the guard adjacent the arcuately curved edge 20a are two sets of recessed sockets 23. The constructional configuration of these recessed sockets 23 is more clearly shown in the enlarged FIGS. 5, 6 and 7. Each socket 23 is formed with walls 25 and 26 that are sloped in converging relationship toward a closed bottom wall. At the decorative surface 22 of the splash guard is preferably continuous and forms a membrane 24 which comprises the bottom wall of the sockets 23. As initially fabricated, all of the sockets 23 are formed with the closed bottom walls 24 to enhance the aesthetic appearance of the ornamental surface 22 with only a pair of the socket walls being punctured at the time of installation to receive the attachment clips 30.

Figure 4:
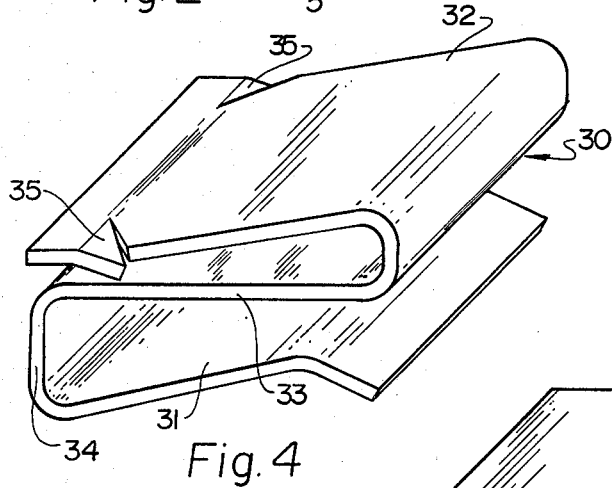
FIG. 4 is a perspective view of a fastening clip for securing the splash guard to a vehicle.

FIG. 4 best illustrates a Z-shaped clip 30 which serves as a means to attach the splash guard 20 to the supporting structure. The clip is preferably made from metal such as steel which has the desired strength and necessary resilient spring characteristic and is preferably coated with a rust resistant finish to remain effective for a maximum period of time. The clips are of a Z-shaped configuration comprising two legs 31 and 32 and an interconnecting bar 33. The two legs 31 and 32 are thus seen to form respective oppositely directed clamping elements with respect to the interconnecting bar. One of the legs termed a facial leg 31 is inserted through an appropriate recessed socket 23 having the bottom wall 24 ruptured and in such a way as to frictionally grip the guard in clamping relationship. An end loop portion 34 of the facial leg 31 projecting through the socket 23 of the splash guard 20 serves as a means to prevent lateral movement of the splash guard. Additionally, the clamping pressure exerted by the leg 31 with respect to the interconnecting bar 33 serves to retain the splash guard in its selected position.

The other leg 32 of the clip preferably includes a pair of barbs 35. The barbed leg 32 is designed to rigidly secure and frictionally engage with an element of the supporting structure which is a marginal edge portion of a relatively thin sheet metal plate. The combination of the barbs 35 and the resilient clamping pressure exerted by the leg 32 with respect to the interconnecting bar 33 assure secure attachment. One clip 30 is used in conjunction with an appropriate slot selected from the set of recessed sockets in the upper end portion 20b of the guard. The second clip is used in conjunction with the appropriate slot in the other set of sockets located near the mid-section of the arcuately curved edge 20a of the splash guard.

Figure 4A:
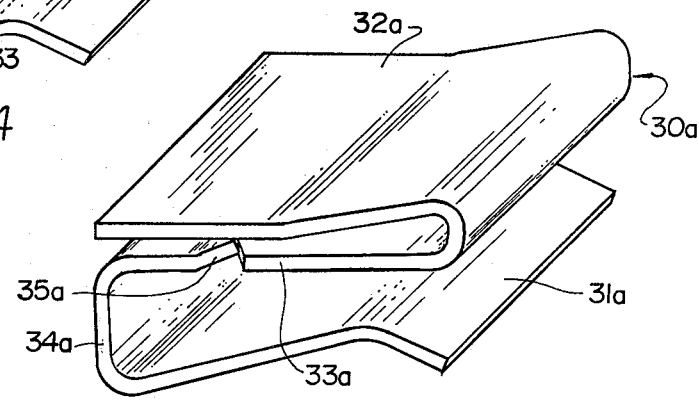
FIG. 4a is a perspective view of a modified clip.

A modified form of an attachment clip 30a is shown in FIG. 4a. This modified clip is of the same general configuration as that previously described and includes respective first and second legs 31a and 32a which are mechanically coupled by an interconnecting bar 33a. The structural difference noted in this modified clip 30a is that the interconnecting bar 33a is formed with the one or more barbs 35a rather than the second leg 32a. However, the modified clip is utilized in the same manner and is capable of performing the same advantageous functions of securely retaining a guard in association with a vehicle body. In addition to this specifically illustrated modification, it will be understood that a clip may be provided with a barb 35a at each longitudinal marginal side-edge or, in certain instances, a plurality of such barbs may be formed along one or more marginal side edge portions.

The third element in the combined assembly of this splash guard is the support structure having a flanged lip 41 including vertically extending portions. The flanged lip 41 exists as a part of the automotive vehicle outer body wall of fender 40 and merely comprises an inturned marginal edge protion of that body wall. Prior splash guards could be used only if the flanged lip had a bead at the lower end over which a clip could fit but current vehicle body styles produced by most automobile manufacturers do not have that specific fender configuration of a horizontal bottom edge. This invention functions without a bead or some other retaining structure due to the nature of the Z-shaped barbed clip 30. Furthermore, this invention functions regardless of the relationship between the inturned flanged lip 41 and an inner wheel well wall 42. In some automotive vehicles, the relationship between the inner wheel well wall 42 and the flanged lip 41 is as shown in FIG. 8 where there is an overlap of the adjacent edge portions of the inner wheel well wall in rearward relationship to the flanged lip. These two sheet metal elements are usually fastened together by welding means of a weld 43. Other models employ a relationship where the inner wheel well wall extends into confirming relationship to the outer fender 40 and lip 41 as shown in FIG. 13. The inner wheel well wall then follows the contour of the fender to the flange and then extends inwardly in parallel and adjacent relationship to the flanged lip. A third relationship exists as between the fender lip and wheel well where, as shown in FIG. 14, the inner wheel well wall 42 is positioned outside the fender's flanged lip 41 and they are welded together. In all three relationships, the present invention can function thereby showing its versatility. In all three types of relationships, the barbed leg 32 engages with either the lip 41 or the wheel well wall 42 as shown in FIG. 8 or 14 and fits between the inner wheel well wall 42 and the flanged lip 41 or clamps to the lip 41 as shown in FIG. 13. The barb 33 frictionally engages with the flanged lip 41 or wheel well wall 42 in clamping relationship in the three usual types of relationships.

Installation or attachment of the splash guard 20 with the supporting structure of the vehicle is convenient and easy. The Z-shaped clips 30 allows for installation without necessitating the removal of the wheel as is usually required where the splash guards are attached by screws that necessitate drilling holes in the lip. For installation, the splash guard 20 in accordance with this invention is held temporatily in the position desired, with the recessed sockets 23 facing towards the wheel well space. For the illustrated guard configuration having a rectangular configuration, the lower edge of the splash guard should be kept parallel to the ground while the other straight edge is vertically aligned. Two marks are made on the flanged lip 41 corresponding to the height of the upper and lower sets of sockets. The splash guard 20 is then placed aside and two clips 30 are attached to the lip 41 (or wheel well wall 42) at the selected positions with the barbed leg 32 frictionally engaging the sheet metal in a mechanically coupled relationship. Next, the splash guard 20 is held adjacent to the clips 30 and determination is made as to which of the slots in the top and bottom sets will work best. Then, using a sharp instrument, such as a knife or screw driver, the thin membrane 24 at the selected socket 23 is punctured and the facial leg 31 is inserted until the splash guard 20 is fully engaged therewith in securely clamped relationship. This procedure is repeated for the lower clip.

Figure 10:
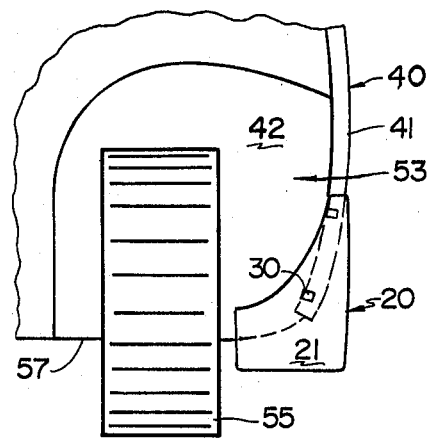
FIG. 10 is a front elevational view of a splash guard mounted on one style of vehicle body.
Figure 11:
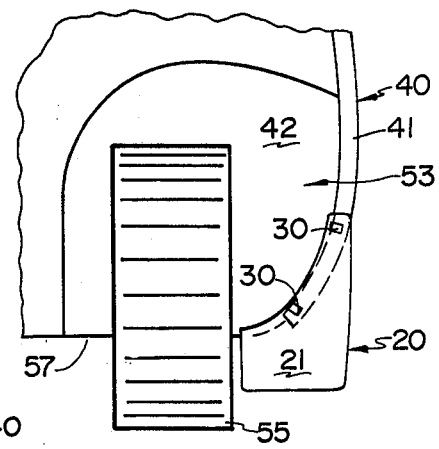
FIG. 11 is a front elevational view of a splash guard mounted on a second style of vehicle body.
Figure 12:
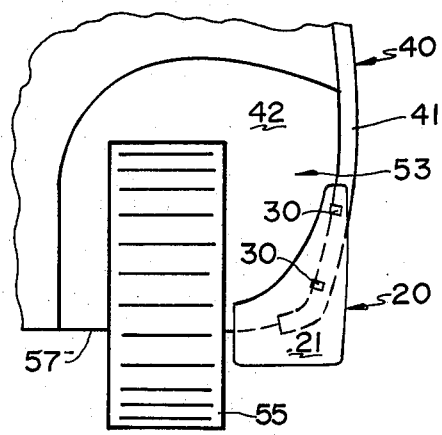
FIG. 12 is a front elevational view of a splash guard mounted on a third style of vehicle body.

The splash guard 20 and attachment clips 30 greatly facilitate mounting on a vehicle and result in a structure that is vertically positionable with ease to a preferred and optimum position. The clips 30 may be positioned at any desired height to conform with the wishes of the owner or the design of the vehicle as shown in FIGS. 10-12 as the clips are readily engageable with lip 41 (or wheel well wall 42) at the selected position. FIG. 10 shows a splash guard positioned to extend just slightly below the lower edge 57 of the vehicle body which is illustrated in FIG. 9. FIG. 11 illustrates vertical adjustment based on owner preference as the splash guard extends much lower than in FIG. 10 and is also displaced laterally outward. FIG. 12 illustrates a different vertical adjustment based on vehicle design as the splash guard is positioned lower than in FIG. 10, necessitated by the more angular design of the inturned outer fender 40.

The splash guard 20 of this invention is usually attached to the vehicle body behind the tires 55 as shown in FIG. 9 with respect to the front wheels. However, the versatility of attachment to the vehicle body achieved by this guard and attachment clips is so great that it can also be mounted on the vehicle body at the front of the wheel well 53 as is illustrated with respect to the rear wheel 55 in FIG. 9. This durable splash guard combination then serves as an effective means to prevent the splashing of rocks, water, and road salt against the surfaces of the automotive vehicle body in the vicinity of the wheel well. It is uniquely capable of secure attachment to the sheet metal elements and the guards are readily mountable without use of tools other than a simple screw driver and knife. There is substantial versatility obtained in position and orientation of mounting to conveniently adapt a standard configured guard to various vehicle body styles and in accordance with specific personal desires.

Having thus described this invention, what is claimed is:

1. A splash guard assembly for an automotive vehicle having a thin, sheet-form mounting plate extending in a generally vertically oriented direction at a wheel opening thereof comprising
   a sheet-form guard member adapted to be supported on said mounting plate and having an elongated marginal edge portion of a configuration to be co-extensive with said mounting plate, said guard member provided with at least two sockets formed in the marginal edge portion and disposed in relatively vertically spaced relationship along the marginal edge portion and a predetermined distance relatively inward of a peripheral edge thereof, and fastening means for securing said guard member to the vehicle mounting plate including a fastening clip secured in each of said sockets, each of said clips being fabricated from an elongated, flat strip of resilient material folded into a predetermined shaped configuration having first and second legs defining respective independent clamping elements, said fastening clips each including an interconnecting bar with said first and second legs connected to opposite ends thereof and extending in superposed relationship thereto to receive the guard member and mounting plate between respective ones of said first and second legs and said interconnecting bar, said first leg adapted to project through a selected one of said sockets to frictionally engage with said guard member in clamped relationship and said second leg adapted to mechanically couple with the vehicle mounting plate in clamped relationship.

2. An assembly according to claim 1 in which said first leg is spaced from said interconnecting bar a distance less than the thickness of said guard member whereby a clamping force will be exerted on said guard member when said clip is assembled therewith.

3. An assembly according to claim 2 wherein said second leg is spaced a distance from said interconnecting bar whereby it will exert a clamping force on a mounting plate when assembled therewith.

4. An assembly according to claim 3 wherein at least one of said second leg and said interconnecting bar is formed with at least one barb-like projection extending in the direction of the other of said second leg or interconnecting bar, said barb-like projection oriented to resist sliding withdrawal of the mounting plate from between that leg and bar.

5. An assembly according to claim 4 wherein said second leg on said interconnecting bar is formed with at least two of said barb-like projections.

6. An assembly according to claim 5 wherein said barb-like projections are formed on respective longitudinal marginal side edge portions of said second leg.

7. An assembly according to claim 4 wherein said barb-like projection is formed on the longitudinal marginal side edge portion of said leg or bar with which it is formed.

8. An assembly according to claim 1 wherein said guard member is formed with two sets of sockets formed in relatively spaced relationship, at least one of said sets of sockets including at least two sockets.

9. An assembly according to claim 8 wherein each of said sets of sockets includes at least two sockets.

10. An assembly according to claim 9 wherein said sockets in each set are disposed in spaced relationship to each other and are disposed at successively greater distance from the peripheral edge of said marginal edge portion.

11. An assembly according to claim 10 wherein said sockets are elongated and are disposed in parallel relationship with respect to their longer axis and to said peripheral edge.

12. An assembly according to claim 10 wherein at least one of said sets of sockets has at least two sockets that are relatively displaced to each other.

13. An assembly according to claim 1 wherein said sockets are formed with a bottom wall said bottom wall being rupturable.

14. An assembly according to claim 1 wherein said guard member is formed from a resiliently flexible material having a predetermined thickness, each of said sockets being formed with a bottom wall which is a relatively thin membrane integrally formed from the guard member material.

15. An assembly according to claim 14 wherein said bottom wall membrane is contiguous with one surface of said guard member.

16. An assembly according to claim 1 wherein said elongated marginal edge portion has an arcuate peripheral edge.

17. In combination:
an automotive vehicle body formed with vertically disposed side wall opening formed therein and a thin, sheet-form mounting plate extending in a generally vertically oriented direction at said wheel opening;
a sheet-form guard member adapted to be supported on said mounting plate and having an elongated marginal edge portion of a configuration to be co-extensive with said mounting plate, said guard member provided with at least two sockets formed in the marginal edge portion and disposed in relatively vertically spaced relationship along the marginal edge portion and a predetermined distance relatively inward of a peripheral edge thereof; and
fastening means for securing said guard member to the vehicle mounting plate including a fastening clip secured in each of said sockets, each clip of said clips being fabricated from an elongated, flat strip of resilient material folded into a predetermined shaped configuration having first and second legs defining respective independent clamping elements, said fastening clips each including an interconnecting bar with said first and second legs connected to opposite ends thereof and extending in superposed relationship thereto to receive the guard member and mounting plate between respective ones of said first and second legs and said interconnecting bar, said first leg adapted to project through a selected one of said sockets to frictionally engage with said guard member in clamped relationship and said second leg adapted to mechanically couple with the vehicle mounting plate in clamped relationship.

18. The combination of claim 17 wherein the sidewall of said vehicle body includes a flanged lip portion projecting a distance inwardly of the body at said wheel opening and forming said mounting plate.

19. The combination of claim 17 wherein said vehicle body includes a flanged lip portion projecting a distance inwardly of the body at said wheel opening and a wheel well wall disposed at said wheel opening, said wheel well wall including a wall member having a marginal edge portion disposed in overlapping, superposed relationship to said flanged lip portion and secured thereto, said clips having the second leg thereof projected between said flanged lip portion and said wheel well wall member, one of said flanged lip portion and said wheel well wall member forming said mounting plate.

20. The combination of claim 19 wherein said wheel well wall member is disposed at one inwardly facing surface of said flanged lip.

21. The combination of claim 19 wherein said wheel well wall member is disposed at an outwardly facing surface of said flanged lip.

22. A splash guard assembly for an automotive vehicle having a thin, sheet-form mounting plate extending in a generally vertically oriented direction at a wheel opening thereof comprising a sheet-form guard member adapted to be supported on said mounting plate and having an elongated marginal edge portion of a configuration to be coextensive with at least a portion of said mounting plate, said guard member provided with at least two sockets formed in the marginal edge portion and disposed in relatively vertically spaced relationship along the marginal edge portion and a predetermined distance relatively inward of a peripheral edge thereof, and fastening means for securing said guard member to said mounting plate including a fastening clip secured in each of said sockets, each of said clips having first and second legs and an elongated interconnecting bar carrying said first and second legs, said interconnecting bar and said first leg formed from an elongated, flat strip of resilient material folded into a U-shaped configuration, thereby defining a clamping element adapted to receive a sheet-form mounting plate in edgewise clamped relationship therebetween and to mechanically interengage therewith, said first leg secured to and resiliently biased toward said interconnecting bar and extending in superposed, substantially coplanar relationship thereto at one side thereof, said second leg carried by said interconnecting bar at a side thereof opposite to said first leg and adapted to project through a selected one of said sockets, said second leg including a clamping surface extending in superposed relationship to said interconnecting bar to mechanically engage with said guard member and clamp said guard member in secured relationship to said interconnecting bar and to thereby secure said guard member with said mounting plate in supported relationship.

* * * * *

REEXAMINATION CERTIFICATE (517th)

United States Patent [19]

Bell et al.

[11] B1 4,293,140
[45] Certificate Issued  Jun. 10, 1986

[54] AUTOMOBILE SPLASH GUARD AND ATTACHMENT MEANS THEREFOR

[75] Inventors: Ted A. Bell, Coshocton; Daniel F. Lehner, Lafayette, both of Ohio

[73] Assignee: Pretty Products, Inc., Coshocton, Ohio

Reexamination Request:
No. 90/000,493, Jan. 25, 1984

Reexamination Certificate for:
Patent No.: 4,293,140
Issued: Oct. 6, 1981
Appl. No.: 966,505
Filed: Dec. 4, 1978

[51] Int. Cl.[4] .............................................. B62D 25/16
[52] U.S. Cl. ............................... 280/154.5 R; 428/31
[58] Field of Search ................ 280/154.5 R, 154.5 A, 280/153 R, 153 A, 152 R, 152 A, 153.5, 155, 154; 428/31, 52, 131-133, 213; 156/91, 92; 293/30, 112, 141; 24/543, 545, 563, 67.9; 411/970, 520, 516

[56] References Cited

U.S. PATENT DOCUMENTS

| | | | |
|---|---|---|---|
| 1,903,469 | 4/1933 | Meader | 24/73 FT |
| 1,934,135 | 11/1933 | McCollum | 280/154.5 R |
| 1,993,067 | 3/1935 | Littlefield | 280/154.5 R |
| 2,077,818 | 4/1937 | Zaiger | 280/154.5 R |
| 2,218,690 | 10/1940 | Strauch | 280/152 R |
| 2,278,691 | 4/1942 | Cotter | 24/73 MF |
| 2,335,058 | 11/1943 | Haltenberger | 280/153 R X |
| 2,559,755 | 7/1951 | Bratz | 280/152 R |
| 2,775,010 | 12/1956 | Bedford, Jr. | 24/73 FT |
| 2,888,971 | 6/1959 | Wootton | 151/41.75 |
| 2,974,383 | 3/1961 | Bright | 156/92 X |
| 3,279,818 | 10/1966 | Jones | 280/154.5 R |
| 4,011,636 | 3/1977 | Malacheski | 24/81 FT X |
| 4,089,537 | 5/1978 | Pralutsky | 280/154.5 R |

FOREIGN PATENT DOCUMENTS 43161  1/1978  Canada .
2529718  1/1977  Fed. Rep. of Germany .
2410591  8/1979  France .
7707829  8/1978  Netherlands .

OTHER PUBLICATIONS

J. C. Whitney & Co., Catalog No. 362C, 1977, p. 67.
Four New Tinnerman Fasteners a Day, pp. 1, 9, 23, 26, 15, 1953.
Spae-Naur Automotive & Industrial Fasteners, Spae-Naur Product (1968) Ltd., p. G11.
1980 Datsun parts card, Sec. No. 254-1.
Industrial Fasteners & Closures, TRW Carr 8 Division Catalogue, Apr. 1976.

*Primary Examiner*—D. W. Underwood
*Attorney, Agent, or Firm*—Robert E. Stebens; Patrick P. Phillips

[57] ABSTRACT

A splash guard structure for automotive vehicles is provided for use in conjunction with a supporting structure having a flanged lip including vertically extending portions. This splash guard structure includes a sheet preferably of heavy rubber formed with two sets of recessed sockets. These sets of sockets are located at respective upper corner and lower portions of an arcuate edge of the splash guard and arranged to accommodate various vehicle body configurations. A thin membrane of the rubber exists at the bottom of each of the sockets of the splash guard and only the membrane of two selected sockets are ruptured for each specific installation thereby maintaining the integrity of the guard to prevent passage of water and debris therethrough. Also included in the combination are two metal clips having a Z-shaped configuration and which are coated with a rust resistant finish and are formed with two legs cooperating with a center interconnecting bar to form clamping elements. The one leg is easily inserted through the membrane of the appropriate socket on the splash guard, while the other leg is conveniently and securely attached to the flanged lip of the supporting structure. The flanged lip, which exists as part of the body fender at the wheel well is engaged in mechanically coupled relationship by barbs formed on the one leg of the clip.

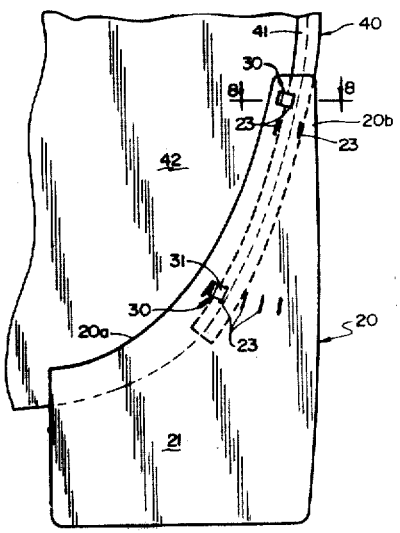

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *